UNITED STATES PATENT OFFICE.

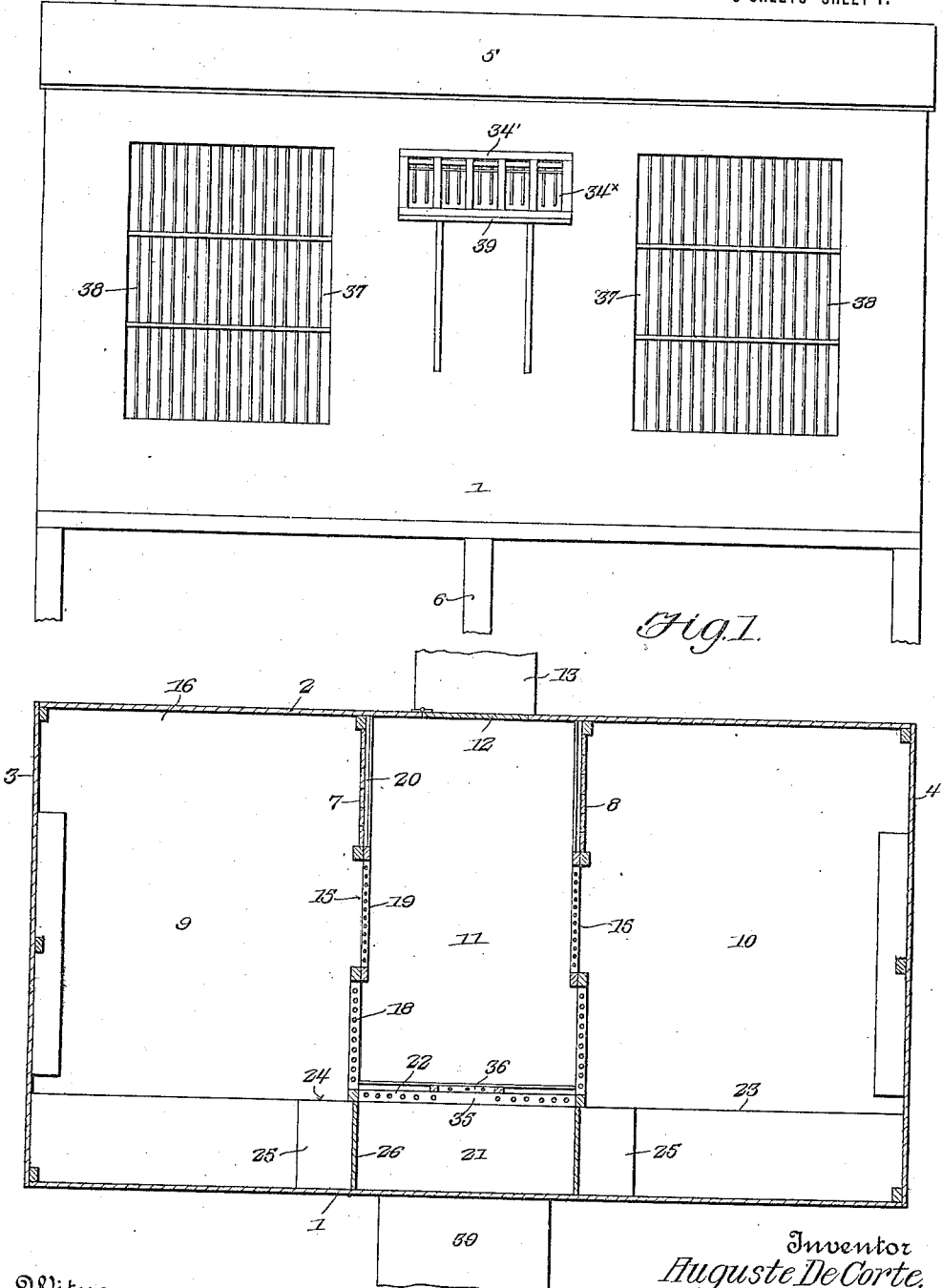

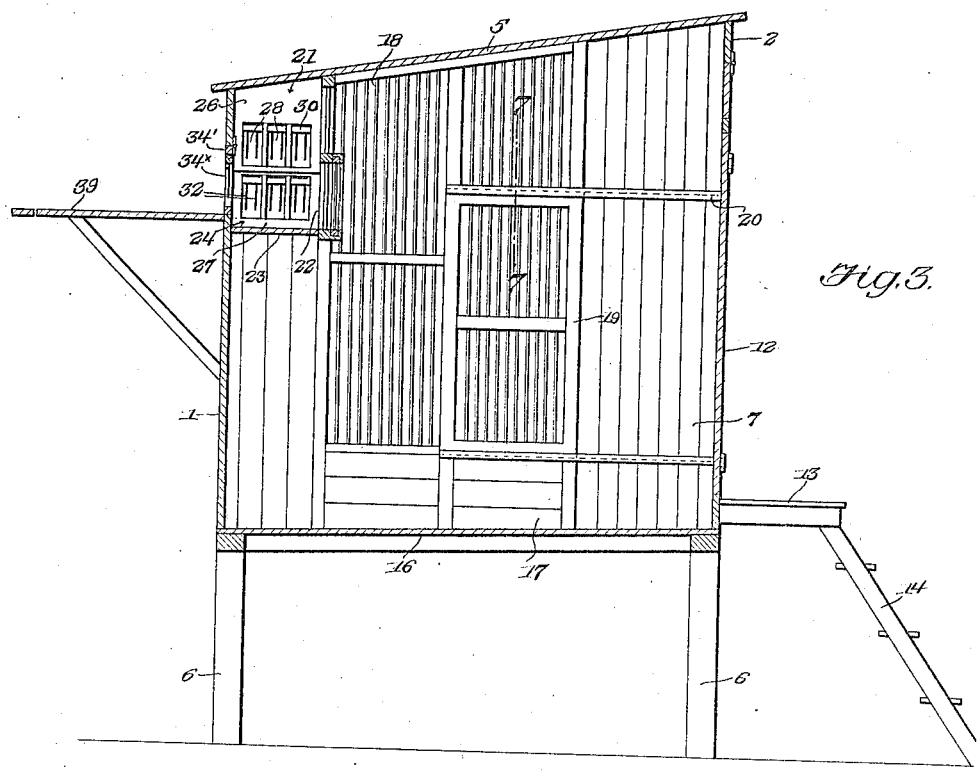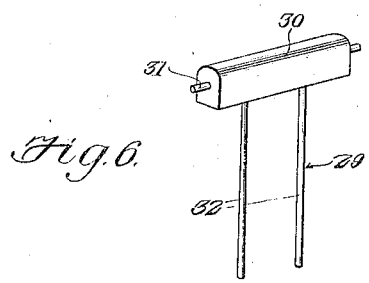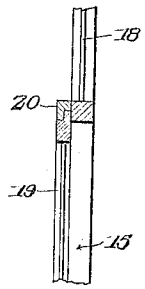

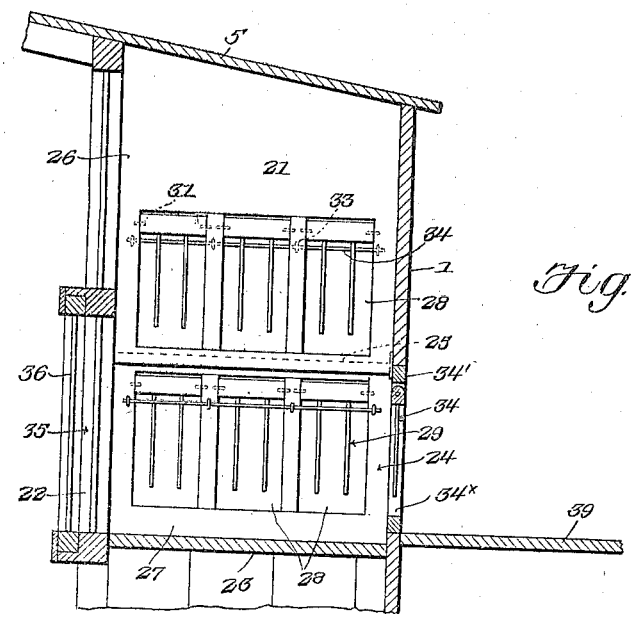
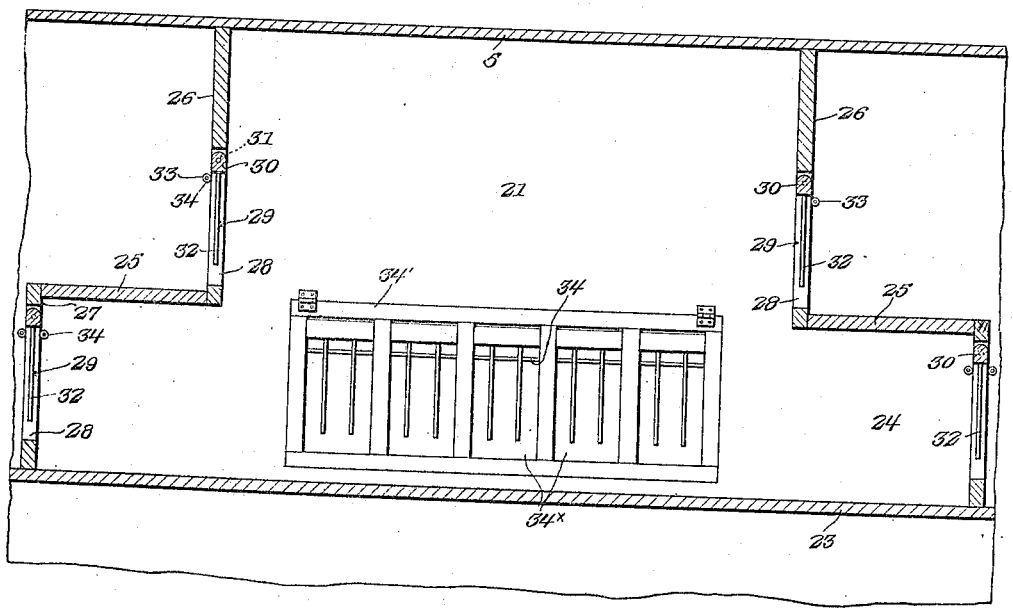

AUGUSTE DE CORTE, OF ROSEBANK, NEW YORK.

PIGEON-LOFT.

1,301,660.  Specification of Letters Patent.  Patented Apr. 22, 1919.

Application filed May 11, 1918. Serial No. 233,989.

*To all whom it may concern:*

Be it known that I, AUGUSTE DE CORTE, a subject of the King of Belgium, residing at Rosebank, Staten Island, in the county of Richmond and State of New York, have invented new and useful Improvements in Pigeon-Lofts, of which the following is a specification.

This invention relates to an improved pigeon loft and the principal objects of the invention are to provide an effective arrangement of parts whereby all danger of the birds injuring themselves or deranging their feathers is eliminated, also means for causing the birds to enter any desired compartment or compartments and for preventing the birds from leaving such compartments.

Another object of the invention is to provide a comparatively small entrance chamber having a plurality of trap doors therein whereby the birds may be held in said chamber or may be permitted to pass from the chamber into one or more compartments.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a front view of the loft.

Fig. 2 is a horizontal section thereof.

Fig. 3 is a central vertical section.

Fig. 4 is an enlarged view taken through the entrance chamber.

Fig. 5 is an enlarged view through the entrance chamber and taken at right angles to Fig. 4.

Fig. 6 is a detail view of one of the trap doors.

Fig. 7 is a section on line 7—7 of Fig. 3.

As shown in these views the loft comprises the front 1, the rear 2 and the two sides 3 and 4. The roof 5 slopes from the rear towards the front. I prefer to place the loft a considerable distance off the ground by means of the posts 6.

A pair of partitions 7 and 8 divide the loft into two compartments 9 and 10 and a hallway 11. A door 12 closes a doorway opening formed in the rear side of the loft and communicates with the hallway.

A landing 13 and steps 14 afford access to said doorway. Each partition is provided with a doorway opening 15, the sill of which is located a considerable height above the floor 16 of the loft and the space between said sill and the floor is filled in by the boards 17. In this manner the dirt from the compartments 9 and 10 is kept out of the hallway. The lower end of the entire partition is composed of boards for the purpose of keeping the dirt out of the hallway. As shown, in Fig. 3 each partition is composed of boarded sections and other sections made up of rounded rods 18 extending vertically and spaced apart. As also shown in this figure the section over the door and the upper and lower sections to one side of said door are made up of these rods while the other sections are boarded up.

It will, of course, be understood that a greater or lesser number of sections can be made of these rods, though the bottom sections must all be made solid to prevent dirt from passing from the compartments to the hallway. Each doorway 15 is adapted to be closed by a sliding door 19, also made up of the rounded rods spaced apart. The doors slide in the guideways 20 located on the hall side of the partitions.

A comparatively small entrance chamber 21 is formed by placing a partition 22 across the front end of the hallway at the upper part thereof and providing a floor 23 for said chamber. I prefer to extend this floor 23 from one side of the loft to the other to provide a resting place or platform for the birds passing from the entrance chamber into the compartments. The lower part of the entrance chamber at each end thereof is provided with an extension or wing 24, these wings extending into the compartments 9 and 10.

A platform 25 forms a top for each wing and said platform connects each end wall 26 of the chamber with the wall 27 of the wing.

As will be seen the walls 26 form continuations of the partitions 7 and 8. The walls 26 and 27 are each provided with a plurality of openings 28. As will be seen these openings 28 have their lower ends a slight distance above the floor 23 and the platforms 25 so that a bird may easily pass from the said floor or platform through said openings. Each opening is controlled by a trap door 29. Each door consists of a block 30, preferably of the form shown in Fig. 6, each end of the block being provided with a pintle 31 which engages a hole formed in the edge wall of the opening. A pair of wires 32 is carried by said block and these wires extend downwardly and are spaced apart as shown in said figure. In this way a bird attempting to pass through the opening will place its head between the wires and thus rock the block on its pintles so as to permit the bird to pass through the opening.

As shown, the ends of the wires are spaced from the bottom of the opening so that as the bird starts through it is prevented from backing out of the opening by the ends of the wires.

I place eye bolts 33 on the walls between the openings on the inner and outer sides of said openings through which I may run wire bars 34 to prevent the doors from opening in one or both directions. For instance, if the wire bar is located on one side of the opening the doors are prevented from swinging toward said bar, but said doors may swing in the other direction. If it is desired to prevent the doors from opening in either direction the wire bars are placed on both sides of the openings.

In the normal position of the parts, however, I so locate the bars that the doors in the wings of the entrance chamber will swing outwardly to permit the pigeons to pass from the entrance chamber into the compartments while the upper doors swing inwardly to permit the birds to light on the platforms 25 and to pass through the upper openings into the entrance chamber. The entrance chamber communicates with the outside of the loft by a plurality of openings 34× made in the front 1 of the loft and these openings are controlled by trap door similar to those just described. These openings 34× are formed in a door 34' hinged to the front. These trap doors are locked by the wires 34. Normally these doors have swinging movement inwardly to permit the entrance of the pigeons, but are prevented from swinging outwardly.

Entrance from the hallway to the chamber 21 may be had through an opening 35 formed in the partition 22 and closed by a sliding door 36. The partition 22 and the door are formed of rounded bars similar to those just described. I provide windows 37 in the front 1 and close said windows by rounded bars 38.

39 is a lighting platform suitably secured on the front 1 and located a slight distance below the openings 34×.

It will thus be seen that the pigeons entering the entrance chamber may pass into either compartment and that the incoming birds will not interfere with the passage of the birds passing from the compartments to the entrance chamber.

It will also be seen that the birds may be easily and quickly driven from one compartment to another and trapped in said compartment or that the birds may be driven into the entrance chamber and trapped therein. In this case the birds may be easily removed from the entrance chamber by means of the door 35.

By using the rounded rods instead of wire netting and the like there is no danger of the birds hurting themselves or ruffling their feathers.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A pigeon loft comprising a pair of partitions dividing the same into a pair of compartments and a hallway, an entrance chamber located in the front of said loft at the upper part thereof and extending across the front end of the hallway, wings formed on the ends of said chamber at the lower part thereof, doorways in the ends of the wings leading to the compartments, other doorways in the ends of the chamber above the wings, the tops of said wings acting as platforms for the upper doorways, entrance doorways leading into the entrance chamber and trap doors controlling said doorways.

In testimony whereof I affix my signature.

AUGUSTE DE CORTE.

Copies of this patent may be obtained for five cents each, by addressing the "Commissioner of Patents, Washington, D. C."